United States Patent [19]

Loest et al.

[11] 4,093,700

[45] June 6, 1978

[54] PROCESS FOR REDUCTION OF ALUNITE ORE IN ALUMINUM RECOVERY PROCESS

[75] Inventors: Kent W. Loest, Broomfield; George H. Kesler, Evergreen, both of Colo.

[73] Assignees: Southwire Company, Carrollton, Ga.; National Steel Corporation, Pittsburgh, Pa.; Earth Sciences, Inc., Golden, Colo.

[21] Appl. No.: 801,054

[22] Filed: May 27, 1977

Related U.S. Application Data

[63] Continuation-in-part of Ser. No. 655,085, Feb. 4, 1976, abandoned.

[51] Int. Cl.² ............................................... C01F 7/06
[52] U.S. Cl. .................................. 423/120; 423/127; 423/131
[58] Field of Search ............... 423/111, 120, 122, 127, 423/131, 629

[56] References Cited

U.S. PATENT DOCUMENTS

| | | | |
|---|---|---|---|
| 1,070,324 | 8/1913 | Chappell | 423/131 |
| 1,189,254 | 7/1916 | Hershman et al. | 423/120 |
| 1,191,105 | 7/1916 | Hershman | 423/131 |
| 1,195,655 | 8/1916 | Chappell | 423/131 |
| 2,120,840 | 6/1938 | McCullough | 423/127 |
| 2,174,684 | 10/1939 | Cameron | 423/120 |
| 3,652,208 | 3/1972 | Burk et al. | 423/127 |
| 3,890,425 | 6/1975 | Stevens et al. | 423/127 |
| 3,890,426 | 6/1975 | Stevens et al. | 423/127 |

FOREIGN PATENT DOCUMENTS

510,536   8/1939   United Kingdom ............... 423/120

*Primary Examiner*—Herbert T. Carter
*Attorney, Agent, or Firm*—Herbert M. Hanegan; Stanley L. Tate; Robert S. Linne

[57] ABSTRACT

The invention is an improvement in the method for recovering aluminum values from alunite ore by roasting the ore to remove water, reducing the ore by roasting it in a reducing atmosphere to remove sulfate, optionally roasting the reduced ore in an oxidizing atmosphere to convert any sulfides formed in the second roast to oxides, leaching the calcined ore with water as a solvent to remove compounds of sulfur and alkali metals, recovering aluminum values as soluble aluminates from the residue from the leaching step by digesting it with at least one alkali metal hydroxide, removing contaminate silica from the resulting leach solution, and precipitating aluminum hydroxide from the solution, the improvement being the use of a two stage reduction of the dehydrated alunite ore, in which the ore is reduced by sulfur in the first stage, followed by a second stage reduction with another reducing agent such as hydrogen.

10 Claims, 1 Drawing Figure

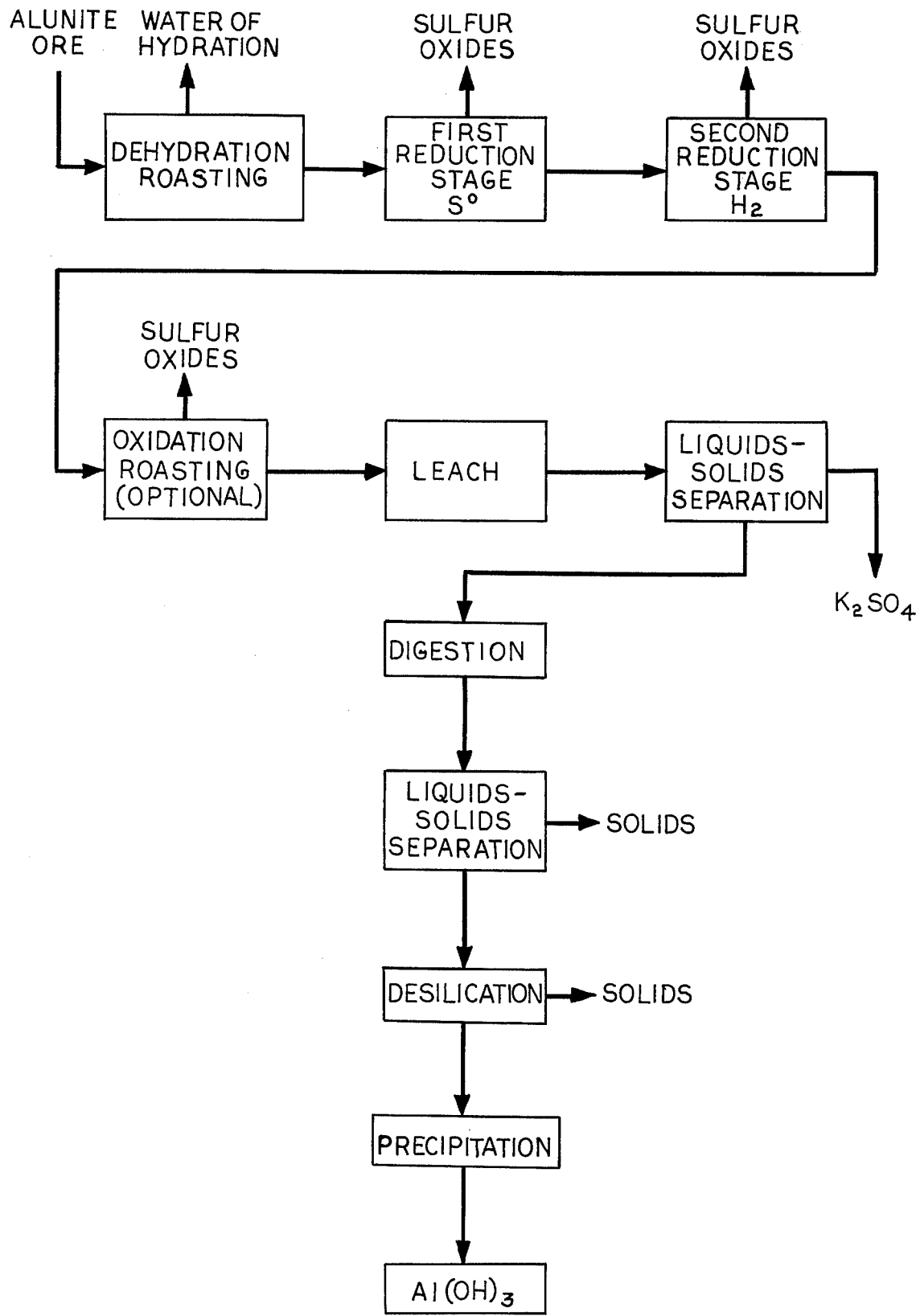

PROCESS FOR REDUCTION OF ALUNITE ORE IN ALUMINUM RECOVERY PROCESS

CROSS-REFERENCES TO RELATED APPLICATIONS

This application is a continuation-in-part application of our U.S. application Ser. No. 655,085 filed Feb. 4, 1976 now abandoned.

The present invention is an improvement in the basic process for recovering aluminum from alunite ore disclosed in U.S. Pat. No. 3,890,425 assigned to a common assignee with this application. The process of this patent is referred to hereinafter as the basic process. This patent and its disclosure are incorporated herein by reference.

BACKGROUND OF THE INVENTION

The invention lies in the field of recovering aluminum from its ores by pyrometallurgical and crystallization techniques.

The present invention is an improvement in the basic process disclosed in the above-referenced and incorporated patent for recovering aluminum from alunite ore, the basic process broadly comprising dehydrating the particulate ore by roasting, removing sulfur and alkali metal compounds from the roasted ore by a reducing roast followed by an optional oxidizing roast and leaching with water as a solvent, resulting in a residue containing aluminum values and a solution containing potassium, sulfate, which may optionally be recovered, digesting the residue with alkaline solution to convert the aluminum values to soluble aluminates, removing silicon from the aluminate solution, and precipitating the aluminum values as aluminum hydroxide from which alumina is recovered.

The invention is an improvement in the above basic process in which a two stage reduction of the dehydrated ore is utilized, sulfur being used as the reducing agent in the first stage and a different reducing agent such as hydrogen being used in the second stage.

As used herein the term "Bayer leach" refers to digestion with at least on alkali metal hydroxide of the residue resulting from the roasting and leaching of the alunite ore as discussed above to remove compounds of sulfur and alkali metals.

In the processing of the calcined alunite ore prior to the Bayer leach, there must be a clean separation of aluminum values and sulfates and the processing, particularly the reduction procedure, must not affect the aluminum content of the ore to reduce the effectiveness of the Bayer procedure. If the sulfates are not completely removed, they will build up to intolerable levels in the Bayer leach circuit as they are soluble in the Bayer leach liquor.

In order to insure a maximum removal of sulfur and alkali metal compounds from the residue with maximum recovery of aluminum it is imperative that the reduction step be as effective as can be obtained. The economical water leaching system demands complete reduction in order to complete the potassium sulfate extraction and produce a sulfur free Bayer feed. A straight hydrogen reduction system produces a completely reduced alunite but it is too expensive for a competitive commercial operation.

Accordingly, it is an object of this invention to provide an improved process for recovering aluminum from alunite ore in which an effective reduction of the ore is obtained with improved economics, resulting in effective separation of sulfate from the dehydrated ore with maximum recovery of aluminum.

SUMMARY OF THE INVENTION

The invention is the introduction of a two stage reduction with sequential use of sulfur and hydrogen or other reducing agent prior to the water leach of the calcined ore in the basic process to provide an economical, effective reduction with effective removal of compounds of sulfur and alkali metals, and the complete process incorporating the improvement comprises roasting particulate alunite ore to remove water of hydration, roasting the dehydrated ore first in a reducing atmosphere of sulfur followed by a second stage roasting in a reducing atomsphere of hydrogen or other reducing agent, optionally roasting the treated ore a third time in an oxidizing atmosphere to convert any sulfides formed in the reducing roast to oxides, leaching the calcined ore with a solvent for the removal of compounds of sulfur and alkali metals, digesting the residue from the leaching step with at least one alkali metal hydroxide to convert aluminum values in the residue to soluble aluminates, removing contaminate silica from the resulting leach solution and recovering aluminum values from the aluminates.

BRIEF DESCRIPTION OF THE DRAWING

The single drawing is a flow diagram of the improved process of this invention.

DESCRIPTION OF THE PREFERRED EMBODIMENTS

The invention will be described in conjunction with the flow sheet of the accompanying drawing and its operation illustrated by the examples set forth below. The advantages of the invention are, of course, related to the two stage reduction of the dehydrated alunite ore to provide an economical reduction and subsequent effective removal of compounds of sulfur and alkali metals. The reducing agents used in the illustrative examples of the two stage reduction are sulfur in the first stage and hydrogen in the second stage. Sulfur must be used in the first stage but other reducing agents than hydrogen can be used in the second stage, such as hydrogen sulfide, carbon monoxide, and others.

The following example is illustrative of the invention but not limiting thereof.

A 1200 g charge of −14 mesh alunite was placed in a vertical stirred reactor. The charge was heated to 600° C with 4 L/min. air flow and dehydrated for 30 minutes. The reactor was then purged with $N_2$ and the charge added.

For the first stage reduction the temperature in the reactor was raised to 590° C and $S^0$ gas was introduced using $N_2$ as a carrier; 100 g of S was introduced over a 60 minute period. After 60 minutes, the reactor was again purged with $N_2$ and sample No. 1 taken. For the second stage reduction on the remainder of the head sample, the temperature was lowered to 560° C. $H_2$ was introduced at the rate of 3.65 L/min. for 60 minutes with sample No. 2 taken at 30 and sample No. 3 taken at 60 minutes, at which point the test was ended and the reactor cooled and discharged. The three samples were oxidized in a muffle furnace, with air purge, at 560° C for 1 hour, each subjected to a water leach, and analysis made of the potassium and sulfur left in the samples for determining the percent potassium and sulfur extracted.

The samples were then subjected to the Bayer leach procedure and the percent aluminum left in the samples determined, this figure indicating the percent aluminum recovered.

The results in terms of potassium and sulfur removal and aluminum recovery in the respective procedures are set forth in the following table.

The temperature range for the two reduction steps described above is about 500° C to about 650° C. The upper temperature must not exceed 650° C for either the dehydration or reduction steps. If the temperature exceeds 650° C a crystalline rather than an amorphous form of $Al_2O_3$ is formed and the former is much more insoluble in the Bayer leach than the crystalline form. Further, above 650° C potassium sulfate breaks down to form $K_2O$ which would react with water in the water leach to form KOH which would dissolve some $AL_2O_3$ with loss of aluminum.

Table 1

| Sample | Description | Leach | Head (%) K | Head (%) S | Head (%) Al | Tail (%) K | Tail (%) S | Tail (%) Al (Bayer) | % Extraction K | % Extraction S | % Extraction Al (Bayer) |
|---|---|---|---|---|---|---|---|---|---|---|---|
| (1) | 60 minute S° Reduced | $H_2O$/Bayer | 4.66 | 2.57 | 11.4 | 0.50 | 0.78 | 1.01 | 90 | 70 | 94 |
| (2) | 30 minute S° & $H_2$ Reduced | $H_2O$/Bayer | 4.73 | 2.16 | 11.4 | 0.37 | 0.20 | 1.12 | 92 | 92 | 93 |
| (3) | 60 minute S° & $H_2$ Reduced | $H_2O$/Bayer | 4.78 | 2.32 | 11.2 | 0.36 | 0.25 | 1.08 | 93 | 90 | 93 |

The term $H_2O$/Bayer indicates that the reduced ore samples, after water leaching followed by separation of the solids and liquid, were subjected to the Bayer leach procedure for determining aluminum recovery. The percentages under the "Head" column are for the samples before water leach with the "Tail" column showing the percentages after water leaching except that the column "Al (Bayer)" shows percentages of aluminum left in the tails from the Bayer leach.

From the above results, it is apparent that $H_2$ contact for short periods of time (30 min. or less) following $S^0$ reduction produces a Bayer feed considerably lower in sulfur content than alunite reduced with $S^0$ alone, thus showing the effectiveness of the two stage reduction. The amount of hydrogen required for the added reduction is economically feasible. The high recovery of aluminum shows that the two stage reduction did not adversely affect the Bayer recovery procedure.

The process is preferably performed to provide about 65–90 percent of the reduction in the first reducing stage with sulfur, the remainder of the reduction being accomplished with $H_2$ in the second stage. This is not critical but results in a very economical use of hydrogen when this gas is used as the reducing atmosphere in the second stage reduction.

Although the invention has been illustrated using an oxidation step after the second stage reduction, this step may be omitted. The invention has been illustrated with the use of water as the leaching agent to remove compounds of sulfur and alkali metals from the reducing residue; however, other solvents, such as ammonium hydroxide, Bayer recycle liquor and alkali metal hydroxides may be used.

It is seen from the above that an effective alunite ore reducing procedure has been provided by the invention using hydrogen and other equally expensive gases for part of the reduction, the process providing improved economic advantages over prior art processes.

What is claimed is:

1. A method for recovering aluminum from alunite ore which comprises:
   (a) dehydrating the ore;
   (b) roasting the dehydrated ore in a reducing atmosphere of sulfur at a temperature up to about 650° C to effect about 65–90 percent reduction of the ore;
   (c) roasting the reduced ore of step (b) at a temperature up to about 650° C in a reducing atmosphere other than sulfur to substantilly completely reduce it;
   (d) leaching the reduced ore from step (c) with a solvent selected from the group consisting of an alkaline solvent and water to remove compounds of sulfur and alkali metals;
   (e) digesting the residue from step (d) with at least one alkali metal hydroxide to convert aluminum values in the residue to soluble aluminates; and
   (f) recovering aluminum values from the soluble aluminates.

2. The method of claim 1 in which the reducing roast of step (c) is followed by an oxidation roast prior to the solvent leach of step (d).

3. A method of claim 1 in which the solvent is water.

4. The method of claim 1 in which the solvent is Bayer leach liquor.

5. The method of claim 1 in which the solvent is ammonium hydroxide.

6. The method of claim 1 in which the solvent is sodium hydroxide.

7. The method of claim 1 in which the solvent is potassium hydroxide.

8. The method of claim 1 in which the alkali metal hydroxide of step (e) is selected from the group consisting of sodium and potassium hydroxide.

9. The method of claim 8 in which the alkali metal hydroxide is sodium hydroxide.

10. The method of claim 1 in which in step (c) the reducing atmosphere is hydrogen.

* * * * *